(12) United States Patent
Kang

(10) Patent No.: US 12,104,789 B2
(45) Date of Patent: Oct. 1, 2024

(54) COMBUSTION CONTROL APPARATUS OF LPG REFORMING SYSTEM AND METHOD FOR CONTROLLING THE SAME

(71) Applicants: Hyundai Motor Company, Seoul (KR); Kia Corporation, Seoul (KR)

(72) Inventor: Woo Ram Kang, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 428 days.

(21) Appl. No.: 17/512,448

(22) Filed: Oct. 27, 2021

(65) Prior Publication Data
US 2022/0341591 A1    Oct. 27, 2022

(30) Foreign Application Priority Data

Apr. 22, 2021   (KR) .................. 10-2021-0052481

(51) Int. Cl.
*F23N 1/02* (2006.01)
*C01B 3/34* (2006.01)

(52) U.S. Cl.
CPC ............... *F23N 1/022* (2013.01); *C01B 3/34* (2013.01); *C01B 2203/0211* (2013.01); *C01B 2203/0283* (2013.01); *C01B 2203/04* (2013.01); *C01B 2203/0811* (2013.01); *C01B 2203/1235* (2013.01); *C01B 2203/1619* (2013.01); *C01B 2203/1623* (2013.01); *F23N 2225/16* (2020.01)

(58) Field of Classification Search
CPC . F23N 1/022; F23N 1/02; F23N 3/002; F23N 2225/16; F23N 3/042
See application file for complete search history.

(56) References Cited

U.S. PATENT DOCUMENTS

2001/0025449 A1*  10/2001  Filippi .................... C09K 5/18
                                                            48/190

FOREIGN PATENT DOCUMENTS

| JP | 5884075 B2 | 3/2016 |
|----|------------|--------|
| JP | 2017100917 A | 6/2017 |
| JP | 6602941 B1 | 11/2019 |
| KR | 101408209 B1 | 6/2014 |

* cited by examiner

*Primary Examiner* — Ko-Wei Lin
(74) *Attorney, Agent, or Firm* — Morgan, Lewis & Bockius LLP

(57) ABSTRACT

A combustion control apparatus of an Liquefied Petroleum Gas (LPG) reforming system and a method for controlling the same may include a burner provided to supply heat to a reformer, a flame temperature analyzer configured to analyze a flame temperature of the burner, an air flow rate calculator configured to determine an initial value of a flow rate of air to be supplied to the burner depending on a flow rate of fuel gas supplied to the burner, and an air flow rate controller electrically connected to the air flow rate calculator and the flame temperature analyzer and configured to select the flow rate of the air at which the flame temperature transmitted by the flame temperature analyzer reaches a maximum while changing the flow rate of the air from the initial value and to control supply of the selected flow rate of the air to the burner.

17 Claims, 4 Drawing Sheets

COMBUSTION CONTROL APPARATUS OF LPG REFORMING SYSTEM AND METHOD FOR CONTROLLING THE SAME

CROSS-REFERENCE TO RELATED APPLICATION

The present application claims priority to Korean Patent Application No. 10-2021-0052481, filed on Apr. 22, 2021, the entire contents of which is incorporated herein for all purposes by this reference.

BACKGROUND OF THE INVENTION

Field of the Invention

The present invention relates to a system for producing hydrogen by reforming liquefied petroleum gas (LPG).

Description of Related Art

A liquefied petroleum gas (LPG) reforming system is equipment which produces hydrogen by reaction between vapor and LPG, and generally includes raw material preprocessing equipment, a reforming reactor, a water-gas shift reactor, hydrogen purification equipment and combustion equipment.

Reforming reaction mainly occurs at a high temperature, and to set the operating temperature of the reformer, a reaction temperature is set in consideration of the conversion rate of a raw material and a hydrogen yield.

Reaching an appropriate reaction temperature and maintenance thereof are realized using thermal energy generated by injecting fuel gas used as a heat source and air into the combustion equipment and combusting the same using a burner.

Off-gas remaining after passing through the hydrogen purification equipment after reforming and water-gas shift reaction is mainly used as the fuel gas of the burner, and when thermal energy generated due to combustion of the off-gas is insufficient to reach the operating temperature of the reformer, mixed gas including Liquefied Petroleum Gas (LPG) which is a raw material of the reforming reaction is used.

Therefore, the fuel gas of the burner may include off-gas and LPG, the composition of LPG varies among the seasons, suppliers and countries, the composition of the fuel gas including the off-gas and LPG is not constant, an air amount necessary for complete combustion varies thereby, and thus, technology for appropriately controlling the flow rate of the air supplied to the burner is required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a combustion control apparatus of an LPG reforming system and a method for controlling the same, in which, even though the components and the composition of fuel gas supplied to a burner of combustion equipment configured to generate thermal energy necessary for the reforming reaction of LPG are changed due to various causes, the optimum flow rate of air may be supplied in a response to such a change and thus complete combustion of the fuel gas may be realized, to maximize combustion efficiency, to reduce costs and to minimize discharge of pollutants due to incomplete combustion.

In accordance with an aspect of the present invention, the above and other objects may be accomplished by the provision of a combustion control apparatus of an LPG reforming system, the combustion control apparatus including a burner provided to supply heat to a reformer, a flame temperature analyzer configured to analyze a flame temperature of the burner through measurement, an air flow rate calculator configured to determine an initial value of a flow rate of air to be supplied to the burner depending on a flow rate of fuel gas supplied to the burner, and an air flow rate controller electrically connected to the air flow rate calculator and the flame temperature analyzer and configured to select the flow rate of the air at which the flame temperature transmitted by the flame temperature analyzer reaches a maximum while changing the flow rate of the air from the initial value of the flow rate of the air determined by the air flow rate calculator, and to control supply of the selected flow rate of the air to the burner.

The combustion control apparatus may further include a reformer temperature controller configured to determine a flow rate of off-gas and a flow rate of LPG for solving a deviation between a measured temperature of the reformer and a set temperature, an off-gas flow rate controller electrically connected to the reformer temperature controller and configured to control the flow rate of the off-gas supplied from an off-gas supplier connected to the burner, to the burner depending on the flow rate of the off-gas determined by the reformer temperature controller, and an LPG flow rate controller electrically connected to the reformer temperature controller and configured to control the flow rate of the LPG supplied from an LPG supplier connected to the LPG supplier, to the burner depending on the flow rate of the LPG determined by the reformer temperature controller.

The air flow rate calculator may receive a sum of the flow rate of the off-gas supplied from the off-gas supplier to the burner and the flow rate of the LPG supplied from the LPG supplier to the burner as the flow rate of the fuel gas supplied to the burner.

The air flow rate controller may be configured to, when an increase in the flame temperature disappears while changing the flow rate of the air supplied to the burner, select the flow rate of the air at a present point in time as the value of the flow rate of the air at which the flame temperature reaches the maximum.

The air flow rate controller may be configured to, when an increase in the flame temperature is converged on less than a designated reference temperature value while changing the flow rate of the air supplied to the burner, select the flow rate of the air at a present point in time as the value of the flow rate of the air at which the flame temperature reaches the maximum.

In accordance with another aspect of the present invention, there is provided a method for controlling a combustion control apparatus of an LPG reforming system, including determining an initial value of a flow rate of air to be supplied to a burner depending on a flow rate of fuel gas supplied to the burner and then supplying the determined initial value of the flow rate of the air to the burner, measuring and analyzing a flame temperature of the burner, and selecting the flow rate of the air at which the flame temperature of the burner becomes a maximum while increasing or decreasing the flow rate of the air supplied to the burner.

The method may further include, before determining the initial value of the flow rate of the air to be supplied to the burner and then supplying the determined initial value of the flow rate of the air to the burner, determining a deviation between a measured temperature of a reformer and a predetermined temperature, determining a flow rate of off-gas and a flow rate of LPG for solving the deviation, and controlling supply of the determined flow rate of the off-gas and the determined flow rate of the LPG to the burner.

The method may further include determining whether or not the flame temperature of the burner is increased while increasing or decreasing the flow rate of the air supplied to the burner, and conversely switching a direction of changing the flow rate of the air upon determining that the flame temperature is not increased and is decreased.

When an increase in the flame temperature disappears while increasing or decreasing the flow rate of the air supplied to the burner, the flow rate of the air at the present point in time may be selected as the value of the flow rate of the air at which the flame temperature reaches the maximum.

When an increase in the flame temperature is converged on less than a designated reference temperature value while increasing or decreasing the flow rate of the air supplied to the burner, the flow rate of the air at the present point in time may be selected as the value of the flow rate of the air at which the flame temperature reaches the maximum.

In the selecting the value of the flow rate of the air at which the flame temperature of the burner becomes the maximum while increasing or decreasing the flow rate of the air supplied to the burner, the value of the flow rate of the air at which the flame temperature of the burner becomes the maximum may be selected using an optimization algorithm.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
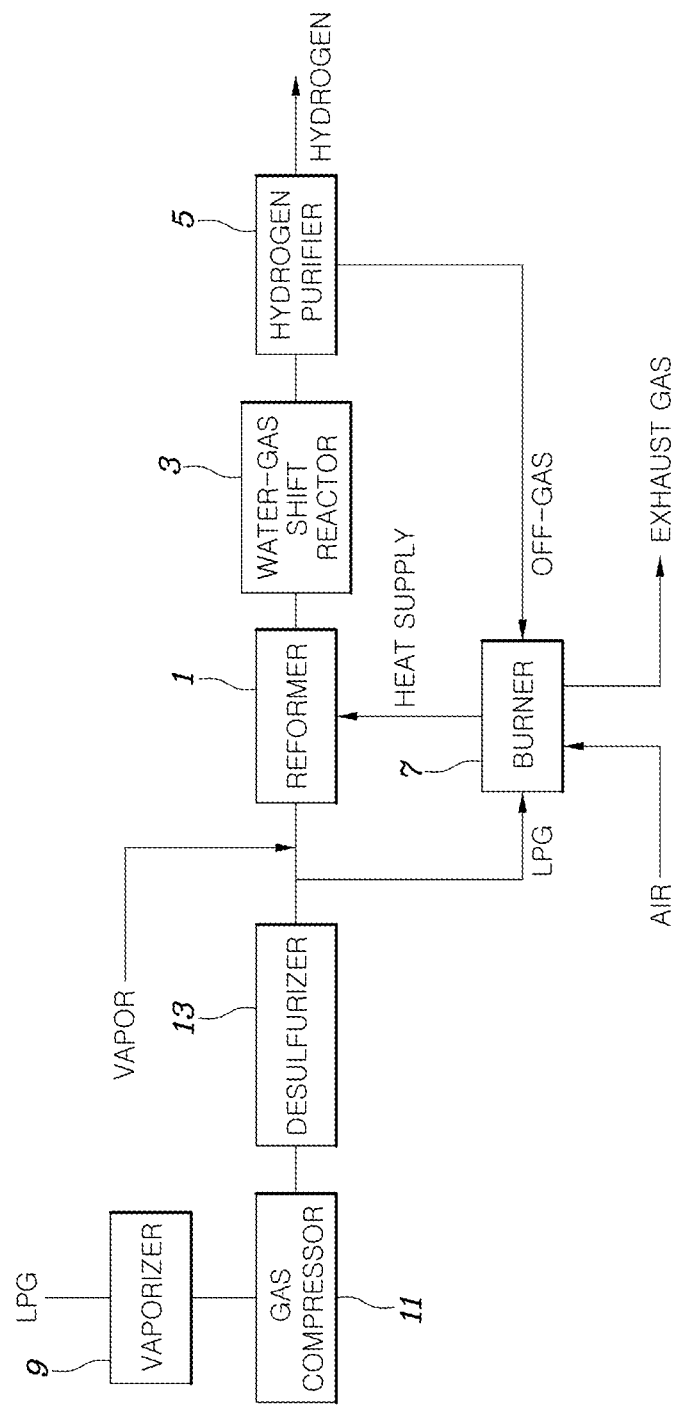
FIG. 1 is a block diagram of an LPG reforming system to which various exemplary embodiments of the present invention is applicable.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions in embodiments of the present invention set forth in the description which follows will be exemplarily provided to describe the exemplary embodiments of the present invention. However, the present invention may be embodied in many alternative forms, and may not be construed as being limited to the exemplary embodiments set forth herein.

The exemplary embodiments of the present invention may be variously modified and changed, and thus specific embodiments of the present invention will be illustrated in the drawings and described in detail in the following description of the exemplary embodiments of the present invention. However, it will be understood that the exemplary embodiments of the present invention are provided only to completely include the present invention and cover modifications, equivalents or alternatives which come within the scope and technical range of the present invention.

In the following description of the embodiments, terms, such as "first" and "second", are used only to describe various elements, and these elements should not be construed as be limited by these terms. These terms are used only to distinguish one element from other elements. For example, a first element described hereinafter may be termed a second element, and similarly, a second element described hereinafter may be termed a first element, without departing from the scope of the present invention.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

The terminology used herein is for the purpose of describing various exemplary embodiments only and is not intended to be limiting. As used herein, singular forms may be intended to include plural forms as well, unless the context clearly indicates otherwise. The terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless defined otherwise, all terms including technical and scientific terms used in the following description have the same meanings as those of terms generally understood by those in the skill in the art. Terms defined in generally used dictionaries will be interpreted as having meanings coinciding with contextual meanings in the related technology, and are not to be interpreted as having ideal or excessively formal meanings unless defined clearly in the description.

Hereinafter, reference will be made in detail to various embodiments of the present invention, examples of which are illustrated in the accompanying drawings and described below. In the drawings, the same or similar elements are denoted by the same reference numerals even when they are depicted in different drawings.

FIG. 1 exemplarily illustrates an LPG reforming system to which various exemplary embodiments of the present invention is applicable, the LPG reforming system includes raw material preprocessing equipment, a reformer 1, a water-gas shift reactor 3, a hydrogen purifier 5 and a burner 7, and the raw material preprocessing equipment includes a vaporizer 9, a gas compressor 11 and a desulfurizer 13.

After the LPG, which is a raw material to be reformed, passes through the vaporizer 9, the gas compressor 11 and the desulfurizer 13, the LPG and vapor are supplied to the reformer 1 and reformed into hydrogen by reforming reaction, and carbon monoxide in reformed gas is converted into hydrogen by the water-gas shift reactor 3.

The produced hydrogen is purified into pure hydrogen by the hydrogen purifier 5, and remaining off-gas is supplied to the burner 7 to supply heat required by the reformer 1. Here, a shortage of fuel gas is supplemented with the LPG.

Figure 2:
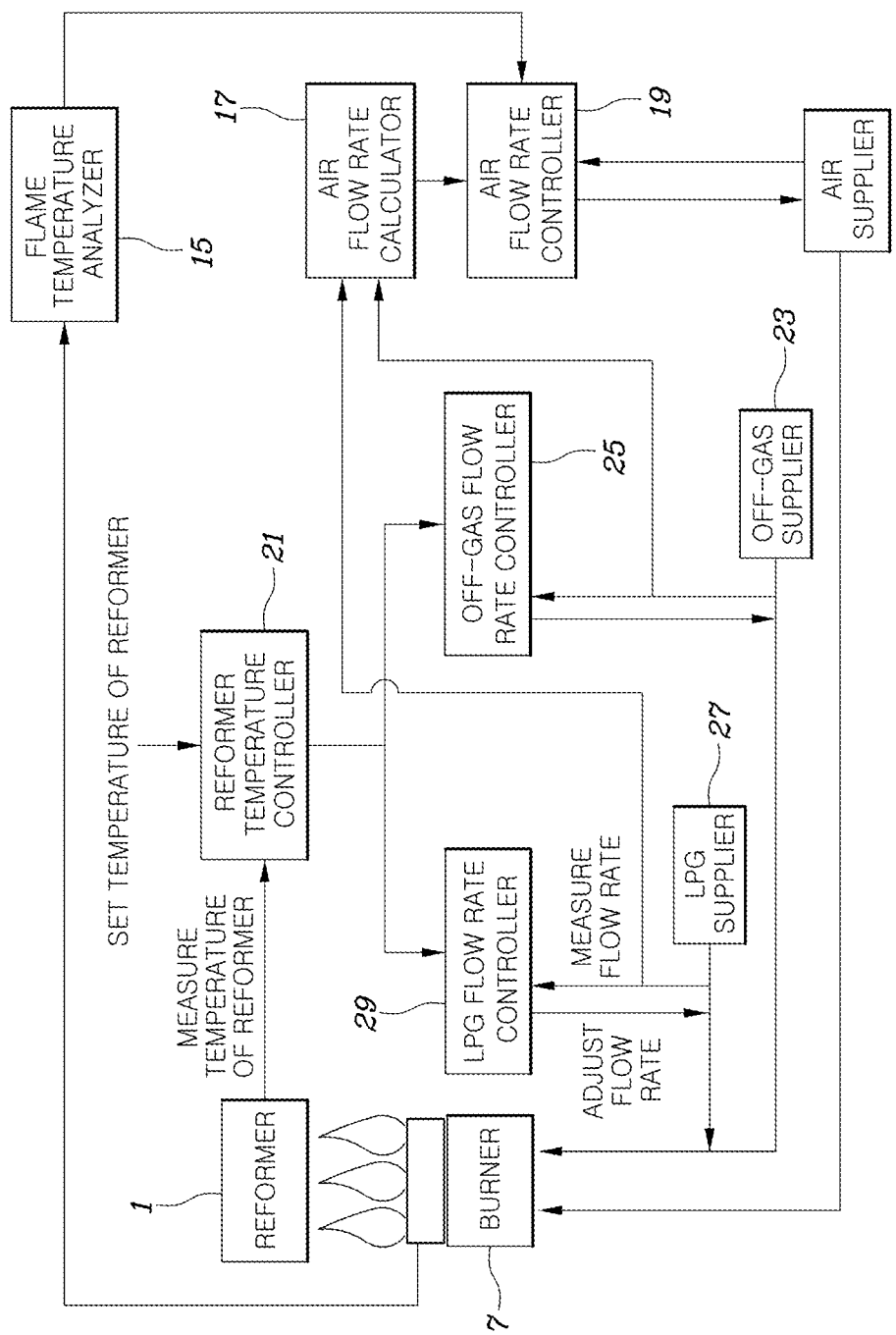
FIG. 2 is a block diagram of a combustion control apparatus of the LPG reforming system according to various exemplary embodiments of the present invention.

FIG. 2 exemplarily illustrates a combustion control apparatus according to various exemplary embodiments of the present invention which is applicable to the above-described LPG reforming system, and the combustion control apparatus includes the burner 7 provided to supply heat to the reformer 1, a flame temperature analyzer 15 configured to analyze the flame temperature of the burner 7 through measurement, an air flow rate calculator 17 configured to determine an initial value of the flow rate of the air to be supplied to the burner 7 depending on the flow rate of fuel gas supplied to the burner 7, and an air flow rate controller 19 configured to select the flow rate of the air at which the flame temperature transmitted by the flame temperature analyzer 15 reaches the maximum while finely changing the flow rate of the air from the initial value of the flow rate of the air determined by the air flow rate calculator 17 and to control supply of the selected flow rate of the air to the burner 7.

That is, the combustion control apparatus according to various exemplary embodiments of the present invention is configured to select the flow rate of the air at which the flame temperature reaches the maximum while monitoring the flame temperature of the burner 7 supplying heat to the reformer 1 and to supply the selected flow rate of the air to the burner 7, being configured for automatically setting a value of the flow rate of the air optimal for the flow rate of the fuel gas supplied to the burner 7.

This is based on a concept in which when the flow rate of the fuel gas supplied to the burner 7 is constant, the flow rate of the air at which the flame temperature of the burner 7 reaches the maximum may be the optimum flow rate of air necessary for complete combustion of the fuel gas.

Therefore, according to various exemplary embodiments of the present invention, despite changes in the composition of LPG among the seasons, suppliers and countries, the optimum flow rate of air necessary for complete combustion of the fuel gas supplied to the burner 7 may be automatically controlled and then supplied, and thus, the operation cost of the LPG reforming system may be reduced due to maximization of combustion efficiency, and discharge of pollutants caused by incomplete combustion of the fuel gas may be minimized.

Referring to FIG. 2, in addition to the above-described elements, the combustion control apparatus may further include a reformer temperature controller 21 configured to determine a flow rate of the off-gas and a flow rate of the LPG for solving a deviation between the measured temperature of the reformer 1 and a predetermined temperature, an off-gas flow rate controller 25 configured to control the flow rate of the off-gas supplied from an off-gas supplier 23 to the burner 7 depending on the flow rate of the off-gas determined by the reformer temperature controller 21, and an LPG flow rate controller 29 configured to control the flow rate of the LPG supplied from an LPG supplier 27 to the burner 7 depending on the flow rate of the LPG determined by the reformer temperature controller 21.

That is, the reformer temperature controller 21 measures the temperature of the reformer 1, determines a deviation between a temperature set by a worker and the measured temperature of the reformer 1, and determines a flow rate of the fuel gas (off-gas+LPG) for solving the deviation.

Furthermore, the off-gas flow rate controller 25 controls the off-gas supplier 23 to supply the flow rate of the off-gas determined by the reformer temperature controller 21 to the burner 7, and the LPG flow rate controller 29 controls the LPG supplier 27 to supply the flow rate of the LPG determined by the reformer temperature controller 21 to the burner 7.

The air flow rate calculator 17 is configured to receive the sum of the flow rate of the off-gas supplied from the off-gas supplier 23 to the burner 7 and the flow rate of the LPG supplied from the LPG supplier 27 to the burner 7, as the flow rate of the fuel gas supplied to the burner 7.

That is, the air flow rate calculator 17 receives the sum of the flow rate of the off-gas and the flow rate of the LPG as the flow rate of the fuel gas, and determines a flow rate of air appropriate to combust the flow rate of the fuel gas as the initial value of the flow rate of air.

Here, the air flow rate calculator 17 may acquire a predetermined value which is experimentally set depending on the ratio of the flow rates of the off-gas and the LPG forming the fuel gas from a map or the like, and set the acquired value to the initial value of the flow rate of air.

The air flow rate controller 19 may be configured to, when an increase in the flame temperature disappears while changing the flow rate of the air supplied to the burner 7, select the flow rate of the air at the present point in time as the value of the flow rate of the air at which the flame temperature reaches the maximum.

That is, when the increase in the flame temperature is gradually decreased and finally comes close to 0 while gradually increasing or decreasing the flow rate of the air supplied to the burner 7 from the initial value, the present state means that the flame temperature reaches the maximum, and thus the flow rate of the air at the present point in time is selected as the value of the flow rate of the air at which the flame temperature reaches the maximum.

Furthermore, the air flow rate controller 19 may be configured to, when an increase in the flame temperature 7 is converged on less than a designated reference temperature value while changing the flow rate of the air supplied to the burner, select the flow rate of the air at the present point in time as the value of the flow rate of the air at which the flame temperature reaches the maximum.

For example, if the reference temperature value is set to 1° C., when the flame temperature is increased and then gradually decreased while gradually increasing or decreasing the flow rate of the air supplied to the burner 7, and the increase in the flame temperature is finally less than 1° C. in spite of the increase or the decrease in the flow rate of air, the flow rate of the air at the present point in time is selected as the value of the flow rate of the air at which the flame temperature reaches the maximum.

Here, the increase or decrease in the flow rate of the air may be set in advance by many tests and analyses, and because, when the increase or decrease is set to an excessively small value, it takes a long time to select the optimum value of the flow rate of air, and when the increase or decrease is set to an excessively large value, it is difficult to converge the actual flow rate of air on the optimum value of the flow rate of air, the increase or decrease in the flow rate of the air may be set to a value within a proper range to prevent these problems.

Figure 3:
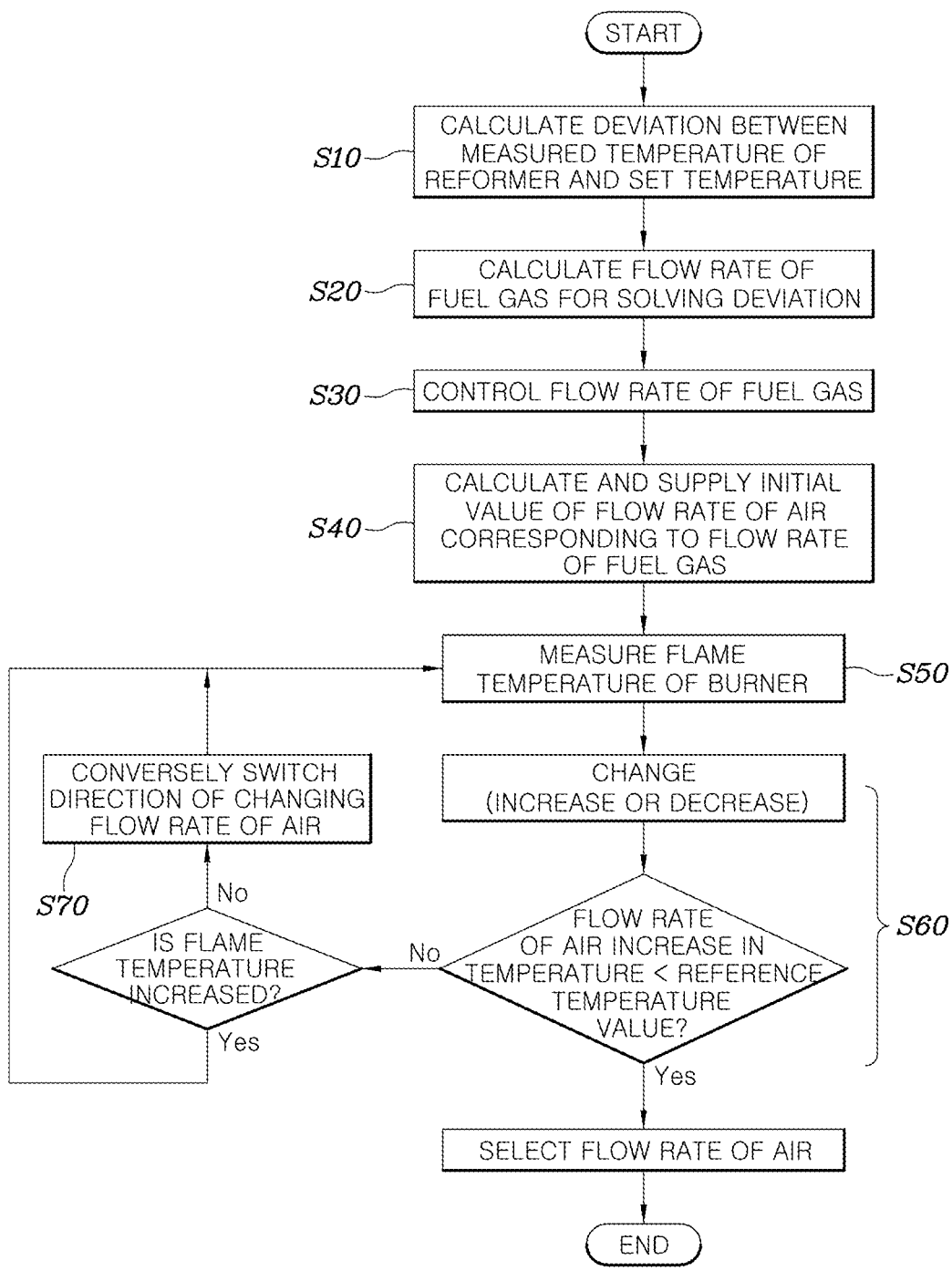
FIG. 3 is a flowchart illustrating a method for controlling the combustion control apparatus according to various exemplary embodiments of the present invention.

Referring to FIG. 3, a method for controlling the combustion control apparatus according to various exemplary embodiments of the present invention includes determining the deviation between the measured temperature of the reformer 1 and the predetermined temperature (S10), determining the flow rate of the off-gas and the flow rate of the LPG for solving the deviation (S20), controlling supply of the determined flow rate of the off-gas and the determined flow rate of the LPG to the burner 7 (S30), determining the initial value of the flow rate of the air to be supplied to the burner 7 depending on the flow rate of the fuel gas supplied to the burner 7 and then supplying the determined initial value of the flow rate of the air to the burner 7 (S40), analyzing the flame temperature of the burner 7 through measurement (S50), and selecting the flow rate of the air at which the flame temperature of the burner 7 becomes the maximum while increasing or decreasing the flow rate of the air supplied to the burner 7 (S60).

That is, the flow rate of the fuel gas for solving the deviation between the measured temperature of the reformer 1 and the predetermined temperature is determined, the initial value of the flow rate of the air appropriate for the amount of the fuel gas supplied to the burner 7 is determined while supplying the determined flow rate of the fuel gas to the burner 7, the value of the flow rate of the air at which the flame temperature of the burner 7 becomes the maximum is selected while gradually changing the flow rate of the air supplied to the burner 7 from the initial value, and the selected flow rate of the air is continuously supplied to the burner 7, realizing complete combustion of the fuel gas supplied to the burner 7.

Furthermore, the method for controlling the combustion control apparatus according to various exemplary embodiments of the present invention includes determining whether or not the flame temperature of the burner 7 is increased while increasing or decreasing the flow rate of the air supplied to the burner 7, and conversely switching a direction of changing the flow rate of the air upon determining that the flame temperature is not increased and is decreased (S70).

For example, whether or not the flame temperature is increased may be determined while increasing the flow rate of the air supplied to the burner 7 from the initial value thereof, the flame temperature may be monitored while continuously increasing the flow rate of the air upon determining that the flame temperature is increased, and the flame temperature may be monitored while continuously decreasing the flow rate of the air supplied to the burner 7 upon determining that the flame temperature is not increased and is decreased.

Therefore, even though the initial value of the flow rate of the air supplied to the burner 7 is set to be greater or less than the optimum value of the flow rate of air, which is desired to be finally determined, the optimum value of the flow rate of the air may be determined, and even though any one of a process of increasing the flow rate of the air from the initial value and a process of decreasing the flow rate of the air from the initial value is executed first, the optimum value of the flow rate of the air may be finally determined by conversely switching the direction of changing the flow rate of the air (S70).

As described above, an increase in the flame temperature disappears while increasing or decreasing the flow rate of the air supplied to the burner, and the flow rate of the air at the present point in time may be selected as the value of the flow rate of the air at which the flame temperature reaches the maximum.

Furthermore, when an increase in the flame temperature is converged on less than a designated reference temperature value while changing the flow rate of the air supplied to the burner 7, the flow rate of the air at the present point in time is selected as the value of the flow rate of the air at which the flame temperature reaches the maximum.

For example, the reference temperature value may be set to 1° C. per unit increase or decrease, as described above.

Figure 4:
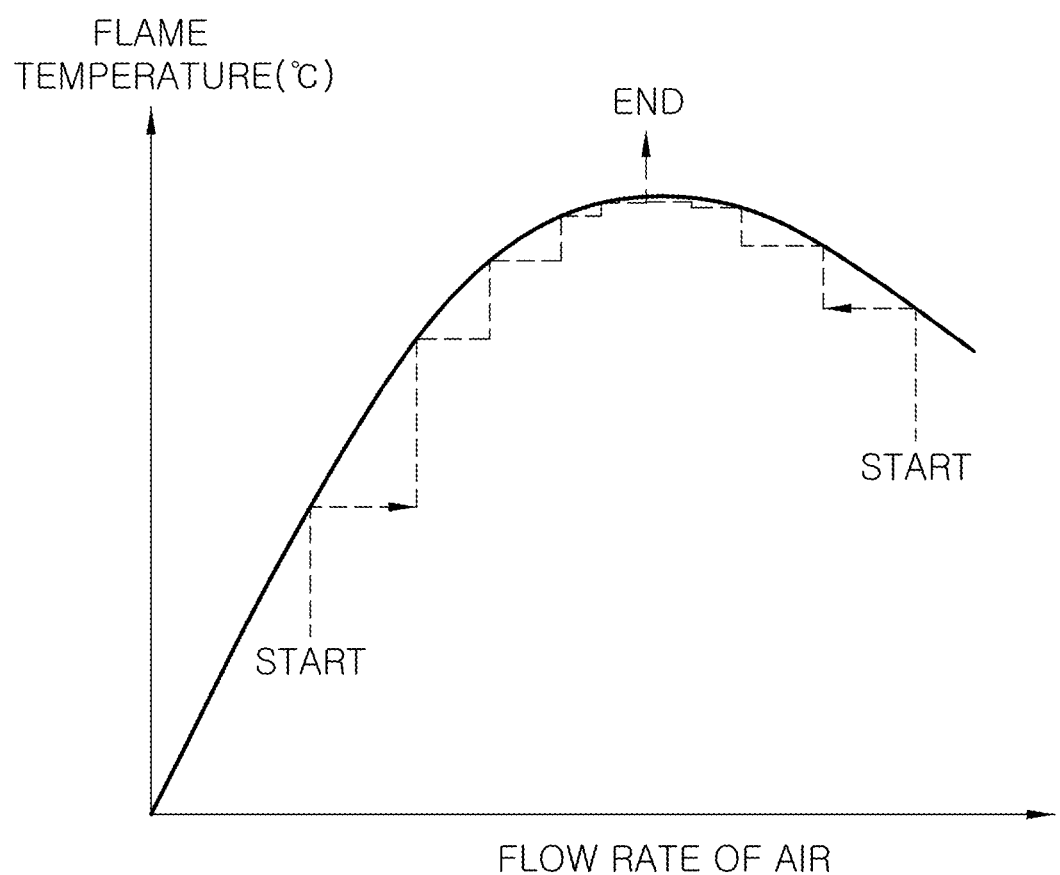
FIG. 4 is a graph illustrating the concept of optimization of the flow rate of the air according to various exemplary embodiments of the present invention.

A process of selecting the value of the flow rate of the air when the increase in the flame temperature disappears or is converged on less than the designated reference temperature value while increasing or decreasing the flow rate of the air supplied to the burner 7, as the value of the flow rate of the air at which the flame temperature reaches the maximum may be expressed in FIG. 4, and in the instant case, among various optimization algorithms, Gradient Descent may be substantially used.

Therefore, in various exemplary embodiments of the present invention, while monitoring the flame temperature of the burner 7, the value of the flow rate of the air at which the flame temperature of the burner 7 reaches the maximum may be selected using various other optimization algorithms, such as Momentum, Nesterov Accelerated Gradient (NAG), Nesterov-accelerated Adaptive Moment Estimation (Nadam), Adaptive Moment Estimation (Adam), Root Mean Square Propagation (RMSProp), Adaptive gradient (Adagrad), AdaDelta, etc.

As is apparent from the above description, in a combustion control apparatus of an LPG reforming system and a method for controlling the same according to various exemplary embodiments of the present invention, even though the components and the composition of fuel gas supplied to a burner of combustion equipment configured to generate thermal energy necessary for the reforming reaction of LPG are changed due to various causes, the optimum flow rate of air may be supplied in a response to such a change and thus complete combustion of the fuel gas may be realized, to maximize combustion efficiency, to reduce costs and to minimize discharge of pollutants due to incomplete combustion.

addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A combustion control apparatus of a Liquefied Petroleum Gas (LPG) reforming system, the combustion control apparatus comprising:
    a burner provided to supply thermal energy to a reformer of the LPG reforming system;
    a flame temperature analyzer configured to analyze a flame temperature of the burner;
    an air flow rate calculator configured to determine an initial value of a flow rate of air to be supplied to the burner depending on a flow rate of fuel gas supplied to the burner; and
    an air flow rate controller electrically connected to the air flow rate calculator and the flame temperature analyzer and configured to select the flow rate of the air at which the flame temperature transmitted by the flame temperature analyzer reaches a maximum while changing the flow rate of the air from the initial value of the flow rate of the air determined by the air flow rate calculator, and to control supply of the selected flow rate of the air to the burner.

2. The combustion control apparatus of claim 1, further including:
    a reformer temperature controller configured to determine a flow rate of off-gas and a flow rate of LPG for solving a deviation between a measured temperature of the reformer and a predetermined temperature;
    an off-gas flow rate controller electrically connected to the reformer temperature controller and configured to control the flow rate of the off-gas supplied from an off-gas supplier connected to the burner, depending on the flow rate of the off-gas determined by the reformer temperature controller; and
    an LPG flow rate controller electrically connected to the reformer temperature controller and configured to control the flow rate of the LPG supplied from an LPG supplier connected to the burner depending on the flow rate of the LPG determined by the reformer temperature controller.

3. The combustion control apparatus of claim 2, wherein the air flow rate calculator receives a sum of the flow rate of the off-gas supplied from the off-gas supplier to the burner and the flow rate of the LPG supplied from the LPG supplier to the burner as the flow rate of the fuel gas supplied to the burner.

4. The combustion control apparatus of claim 1, wherein the air flow rate controller is configured to, when an increase in the flame temperature disappears while changing the flow rate of the air supplied to the burner, select the flow rate of the air at a present point in time as the value of the flow rate of the air at which the flame temperature reaches the maximum.

5. The combustion control apparatus of claim 1, wherein the air flow rate controller is configured to, when an increase in the flame temperature is converged on less than a designated reference temperature value while changing the flow rate of the air supplied to the burner, select the flow rate of the air at a present point in time as the value of the flow rate of the air at which the flame temperature reaches the maximum.

6. A method for controlling a combustion control apparatus of a Liquefied Petroleum Gas (LPG) reforming system, comprising:
    determining, by a processor, an initial value of a flow rate of air to be supplied to a burner depending on a flow rate of fuel gas supplied to the burner and then controlling, by the processor, the air supplied to the burner based on the determined initial value of the flow rate of the air;

measuring and analyzing, by the processor, a flame temperature of the burner; and selecting, by the processor, the flow rate of the air at which the flame temperature of the burner becomes a maximum while increasing or decreasing the flow rate of the air supplied to the burner.

7. The method of claim 6, further including, before determining the initial value of the flow rate of the air to be supplied to the burner and then supplying the determined initial value of the flow rate of the air to the burner, determining, by the processor, a deviation between a measured temperature of a reformer of the LPG reforming system and a predetermined temperature;

determining, by the processor, a flow rate of off-gas and a flow rate of LPG for solving the deviation; and controlling, by the processor, supply of the off-gas based on the determined flow rate of the off-gas and supply of the LPG based on the determined flow rate of the LPG to the burner.

8. The method of claim 6, further including determining, by the processor, whether or not the flame temperature of the burner is increased while increasing or decreasing the flow rate of the air supplied to the burner, and conversely switching, by the processor, a direction of changing the flow rate of the air upon determining that the flame temperature is not increased and is decreased.

9. The method of claim 6, wherein, when an increase in the flame temperature disappears while increasing or decreasing the flow rate of the air supplied to the burner, the flow rate of the air at a present point in time is selected as the value of the flow rate of the air at which the flame temperature reaches the maximum.

10. The method of claim 6, wherein, when an increase in the flame temperature is converged on less than a designated reference temperature value while increasing or decreasing the flow rate of the air supplied to the burner, the flow rate of the air at a present point in time is selected as the value of the flow rate of the air at which the flame temperature reaches the maximum.

11. The method of claim 6, wherein, in the selecting the value of the flow rate of the air at which the flame temperature of the burner becomes the maximum while increasing or decreasing the flow rate of the air supplied to the burner, the value of the flow rate of the air at which the flame temperature of the burner becomes the maximum is selected using an optimization algorithm.

12. A non-transitory computer readable storage medium on which a program for performing the method of claim 6 is recorded.

13. A combustion control apparatus of a Liquefied Petroleum Gas (LPG) reforming system, the combustion control apparatus comprising:

a burner provided to supply thermal energy to a reformer of the LPG reforming system; and a processor configured to:

determine an initial value of a flow rate of air to be supplied to the burner depending on a flow rate of fuel gas supplied to the burner and then supply air to the burner based on the determined initial value of the flow rate of the air;

measure and analyze a flame temperature of the burner; and select the flow rate of the air at which the flame temperature of the burner becomes a maximum while increasing or decreasing the flow rate of the air supplied to the burner.

14. The combustion control apparatus of claim 13, wherein the processor is configured to:

before determining the initial value of the flow rate of the air to be supplied to the burner and then supplying the determined initial value of the flow rate of the air to the burner, determine a deviation between a measured temperature of the reformer of the LPG reforming system and a predetermined temperature;

determine a flow rate of off-gas and a flow rate of LPG for solving the deviation; and control supply of the off-gas based on the determined flow rate of the off-gas and supply of the LPG based on the determined flow rate of the LPG to the burner.

15. The combustion control apparatus of claim 13, wherein the processor is configured to:

determine whether or not the flame temperature of the burner is increased while increasing or decreasing the flow rate of the air supplied to the burner, and conversely switching, by the processor, a direction of changing the flow rate of the air upon determining that the flame temperature is not increased and is decreased.

16. The combustion control apparatus of claim 13, wherein the processor is configured to:

when an increase in the flame temperature disappears while increasing or decreasing the flow rate of the air supplied to the burner, select the flow rate of the air at a present point in time as the value of the flow rate of the air at which the flame temperature reaches the maximum.

17. The combustion control apparatus of claim 13, wherein the processor is configured to:

when an increase in the flame temperature is converged on less than a designated reference temperature value while increasing or decreasing the flow rate of the air supplied to the burner, select the flow rate of the air at a present point in time as the value of the flow rate of the air at which the flame temperature reaches the maximum.

* * * * *